W. E. CUMMINGS.
AUTO SPRING BED.
APPLICATION FILED MAY 3, 1916.
1,349,268. Patented Aug. 10, 1920.
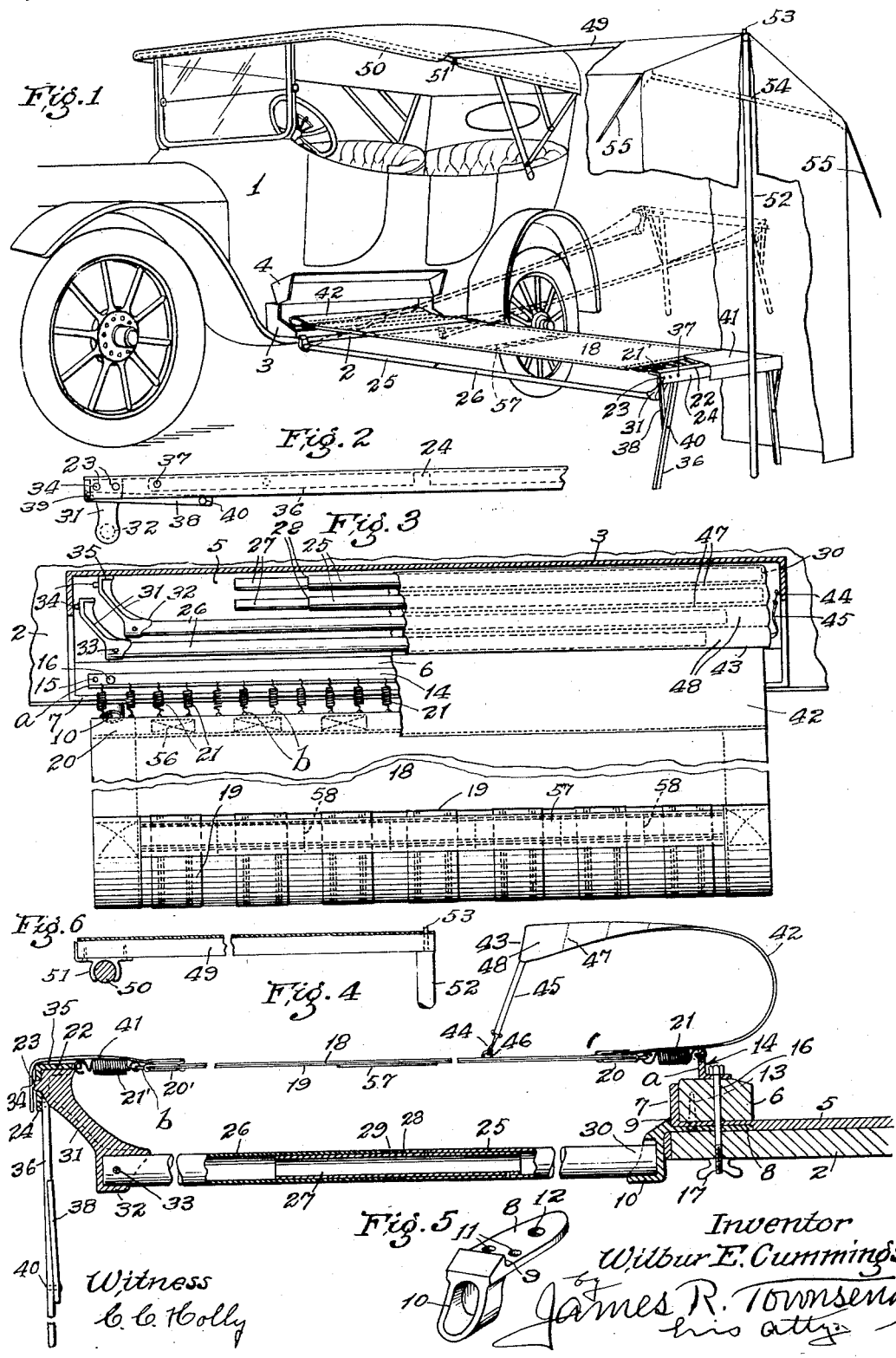

UNITED STATES PATENT OFFICE.

WILBUR E. CUMMINGS, OF HOLLYWOOD, CALIFORNIA.

AUTO SPRING-BED.

1,349,268.

Specification of Letters Patent. Patented Aug. 10, 1920.

Application filed May 3, 1916. Serial No. 95,261.

*To all whom it may concern:*

Be it known that I, WILBUR E. CUMMINGS, a citizen of the United States, residing at Hollywood, in the county of Los Angeles and State of California, have invented a new and useful Auto Spring-Bed, of which the following is a specification.

An object of this invention is to provide means suitable for application to an automobile whereby the automobile is provided with a bed that can be stored in a very small space and that is convenient for being quickly set up when it is desired to use the same at a camping or stopping place.

An object is to provide a tent-bed for the use of tourists touring in automobiles or other vehicles to enable them to have a convenient outdoor bed at any stopping-place.

The invention is adapted to be used with or without a tent appliance and it is understood that the body or covering of the automobile may be used as a support for one end of a tent or awning to cover the bed.

An object of the invention is to make provision whereby the bed bottom will be stretched taut when the bed is set up and will not sag in such a way as to cause the occupants of the bed to roll to the center.

A broad feature of novelty in connection with this invention is the utilization of the running board of the automobile for a combined storage place for the collapsed bed, and a rigid support for one end of the extended bed, and to afford a purchase for the mechanism that stretches the bed bottom in the operation of setting up the bed.

Another object of the invention is to provide a simple and easily operated powerful means for holding the bed bottom taut in a virtually horizontal position.

Another object is to maximize the comfort of the bed and to hold the bedding so as to protect the feet of the occupant from cold.

A further object is to provide a cheap and simple attachment by which any automobile with a running board can be easily provided with a camping bed.

While a feature of the invention involves the idea of utilizing the running board of the automobile as a support for the set-up bed, it is understood that other stationary parts of the automobile are available for this purpose. For example, the back of the rear seat and the rear end of the automobile may be used as the support and for the fixed end of the bed bottom and the stretching mechanism.

The construction of the bed bottom and the stretching appliance is such that the stretching appliance may be attached to any stable support where it is desired to use the bed as a stationary equipment.

Other objects, advantages and features of novelty may appear from the accompanying drawings and the subjoined detail description and appended claims.

The accompanying drawings illustrate the invention.

Figure 1 is a perspective view of this invention set up ready for use. Dotted lines indicate a position parts may occupy just before the bed bottom is stretched in the operation of setting up the bed. Fragments of a tent supported at one end by the automobile top are shown.

Fig. 2 is an enlarged fragmental view of the outer end of the bed before it is set up.

Fig. 3 is a broken detail plan view of the bed with parts of the bed bottom partly rolled up preparatory to storing.

Fig. 4 is a fragmental longitudinal sectional view of the set-up bed.

Fig. 5 is a perspective view of one of the stationary brackets detached.

Fig. 6 is an enlarged fragmental and partly sectional view of the tent-supporting means shown in Fig. 1.

The automobile 1 constitutes a fixed and stable support for one end of the bed bottom, and in the form shown the running board 2 of said automobile is the immediate fixed and stable support of the storing appliance. The storing appliance, which in the form shown comprises the attaching device 3, is formed as the bottom of a box having a lid 4 adapted to accommodate and, together with the attaching device 3, to form a housing for the bed bottom and certain connected parts.

Said attaching device may be a box bottom formed of the bottom plate 5, bottom bar 6, front plate 7, and the brackets, each comprising the bracket plate 8 having a shoulder 9 and a socket 10 at its outer end. Said plate 8 is provided with holes 11, 12 through which bolts and screws may be passed to secure the bracket to the attaching device.

Screws 13 inserted through the holes 11 attach the bracket plates 8 to the bottom plate 5 and the bottom bar 6. An anchor bar 14 formed of an angle-iron is fastened by screws 15 to the bottom bar 6. The attaching device is detachably connected to the running board 2 by bolts 16 and thumb-nuts 17 so as to be readily detached. Said bolts 16 extend through the angle-iron 14, the bottom bar 6, the central holes 12 in the bracket plates 8 and through the running-board 2, and are secured by the thumb-nut 17 underneath the running-board.

The bed bottom proper is composed of a sheet 18 preferably of canvas or the like reinforced at close intervals with longitudinal webbing strips 19 and by end folds 20 to which are attached helical springs 21 that are connected to the bed bottom in the usual way at one end and are connected at the other end to the upright limb of the anchor plate or bar 14. One end of the bed bottom sheet is thus supported by the anchor plate. The outer end of the bed bottom is correspondingly constructed with a fold 20'. Helical springs 21' are detachably connected at their outer ends with the horizontal limb 22 of the supporting plate or cross bar, that is shown as an angle-iron having perforations 23 in its dependent limb 24.

Stretching rails are provided to hold the bed bottom taut. Said rails are preferably jointed for convenience in storing and are shown composed of sections 25, 26 jointed together; the sections 25 having internal sleeves 27 and a shoulder 28, so that the internal sleeve 27 may be inserted into the section 26 until the shoulder 28 comes into contact with the end of the section 26. These rails are made extensible by means of collars 29 made to fit the internal sleeve 27 and to space the shoulder 28 from the end of the section 26, thus increasing the length of the rails to take up any stretch that might occur in the bed bottom.

One end of the rails is plain as at 30 to enter the sockets 10 loosely. The stretching rails thus pivotally and detachably engage at one end, the stable support below the level of the stationary end of the bed bottom. The outer ends of the rails are provided with oblique arms or standards 31 having sockets 32 in which the outer ends of the rails are seated and secured by rivets 33. Said oblique standards are provided with studs 34 and with heads 35. The studs 34 fit in the holes 23 in the depending limbs 24 of the outer angle-iron.

The sockets 10 are set below the level of the support formed by the anchor plate, and extend outward from the running board 2 away from the vertical plane of the upright limb a of the anchor plate 14; and the rails with their oblique standards are of such length that the stretching means are adapted to stretch the bed bottom and to hold it sufficiently taut for practical use as it is brought toward horizontal position. It should be noted, however, that undue stretching of the bed bottom is prevented by the strips 19.

The sockets 10 are arranged at a level considerably below that of the stable support and its anchor limb a, so that when the rails are aslant with their ends 30 in the sockets 10 of the brackets, the limb 24 of the free supporting plate or cross bar, can be easily brought over the outer ends of the oblique standards, and the studs 34 inserted into the holes 23 indicated in dotted lines in Fig. 1. At this position the bed bottom will be loose. When the rails are brought down to the horizontal position, the distance between the outer upper ends of the oblique standards and the anchor limb a is increased, thus drawing the bed bottom taut and stretching the helical springs 21, 21'.

The drop-legs 36 are pivoted by pivots 37 to the supporting bar and are held in extended position by the braces 38 pivoted at 39 to said supporting bar and carrying a pin 40 to hold the drop leg 36 rigid in the position shown in Fig. 1.

A head-flap 41 is sewed to the canvas bottom 18 and is adapted to extend over and cover the helical springs 21' and the supporting bar 22. A corresponding flap 42 is provided for the stationary end of the bed bottom and is fastened to the canvas sheet and is adapted to extend over the bottom of the bedding, not shown, and is provided at its free end 43 with snap-hooks 44 connected to said free edge 43 by straps 45 and connected to the bed bottom by hooking the snap-hooks 44 into rings 46 connected to the canvas sheet of the bed bottom.

The flap 42 is preferably made of double thickness, stitched at intervals as indicated at 47 to form pockets 48 for holding the bed rails when they are stored and to prevent any rattling of the same when stored.

The stationary flap 42 affords a cover for the collapsed bed bottom and its parts, and it is understood that the box top 4 may be omitted. A canvas cover or roll, not shown, may be used in the place of the box-top 4 to protect the bed from the weather.

In practice the apparatus is stored on the running board or other like support when not in use and when it is desired to use the bed, the bed bottom and its attachments will be unhoused. The jointed rails will be put together and the ends 30 inserted in the sockets of the brackets. Then the outer ends of the rails will be elevated and the supporting bar will be brought on top of the same with the lugs 34 in the holes 23. The drop-legs 36 will then be extended and fastened by the braces 38, and then the bed bottom and the rails will be brought down into horizontal position. This operation stretches the bed bottom and makes it taut, but if sufficient tension is not thus put upon the helical springs, the extension collars 29 may be inserted as shown in Fig. 4. It is understood that the extension collars may be of any desired length adapted to cause the proper tension to be brought onto the helical springs when the bed bottom is brought into horizontal position.

Then the bedding including the mattress and bed covering, not shown, may be put on the bed bottom, and the flap 42 brought over the end of the bed covering, not shown, and fastened to the bed bottom by the snaps 44 and rings 46 as shown in Fig. 4.

It is necessary, in order to carry out this invention that a stable support such as is formed by the auto body and the running board 2 shall be provided to support the sockets 10 and to withstand the stress exerted by the toggle joint action of the rails when the bed rails are brought down into horizontal position as above described.

When the bed is set up for use, a tent provides the necessary privacy and the protection therefor from the elements. In the simple form of tent shown, a ridge pole 49 may be hooked at one end to the frame work 50 of the automobile top by means of a clip 51, constituting fastening means to prevent longitudinal movement in either direction.

The other end of the ridge pole may be supported by a post 52 which is connected by a pin 53 to said ridge pole 49.

A spreading bar 54 is connected to the corners at the end of the tent to hold the tent in form over the bed and the tent will be supplied with the usual guy ropes 55.

The webbing strips 19 are attached at their ends to the sheet 18 by stitching 56, and the helical springs 21, 21' are connected in pairs to the ends of the webbing 19 by the awning hooks or rings $b$ of the usual construction.

A transverse webbing strip 57 is fastened by stitches 58 to the canvas sheet 18 between the longitudinal webbing strips 19 underneath their ends and near the middle thereof to hold the longitudinal webbing strips in place when the bed bottom is loosened. Said strips are shown otherwise unfastened except at the end stitching 56.

The operation of setting up the bed will be understood from the foregoing.

To collapse the bed the supporting bar will be raised, the legs folded up, the stretching rails detached, and their sections disjointed and inserted in the sheaths or pockets 48, and the bed bottom will be rolled up and stored on the running board where it may be covered over or housed by any suitable means as the box 4. The bedding, not shown, may also be housed and stored in the same receptacle with the bed bottom, the anchor bar, cross bar and rails.

I claim:—

1. The combination with a stable vehicular support; of a bed bottom comprising a sheet resiliently and detachably connected directly at one end to said support at one level; a crossbar resiliently and detachably connected directly to the other end of the bed bottom; stretching means pivotally and detachably engaging the support at a lower level than the bed bottom and provided with arms extending up and connected to the crossbar; and means to support said crossbar; whereby the crossbar is elevated above the level of the stable vehicular support.

2. The combination with the running board of a vehicle; of a bed bottom adapted to be rolled up for storage upon the running board and to be resiliently and detachably connected at one end to said running board, and being provided at the other end with a supporting bar; sockets connected to said running board; rails having one end inserted in the sockets and being provided at the other end with oblique standards adapted to connect with the supporting bar; said sockets being below the level of, and projecting outwardly from the vertical plane of the bed bottom connection; and said oblique standards extending outwardly so that when the rails are aslant, the bed bottom will be loose, and when the rails are lowered into a horizontal position they will operate to tighten and stretch the bed bottom.

3. A bed bottom comprising a sheet; means detachably connected with the ends of the sheet for holding it taut in a virtually horizontal position and reinforcing strips extending along the sheet and fastened thereto only at the ends to prevent undue longitudinal stretching of the sheet.

4. A bed bottom comprising a sheet; detachable means at the end of the sheet for holding it taut in a virtually horizontal position; springs between said sheet and said means; and webbing reinforcing strips extending along the sheet and fastened thereto only at the ends to prevent longitudinal stretching of the sheet.

5. A bed bottom comprising a sheet; means resiliently and detachably connected with the ends of the sheet for holding it taut in a virtually horizontal position; reinforcing strips extending along and under the sheet and fastened thereto only at the ends to prevent undue longitudinal stretching of the sheet; and a transverse strip under the longitudinal strips between their ends; said transverse strip being fastened only to said sheet between the longitudinal strips.

In testimony whereof, I have hereunto set my hand at Los Angeles, California, this 27th day of April, 1916.

WILBUR E. CUMMINGS.

Witness:
James R. Townsend.